United States Patent
Han et al.

(10) Patent No.: US 8,644,635 B2
(45) Date of Patent: Feb. 4, 2014

(54) IMAGE PROCESSING METHOD AND IMAGE PROCESSING APPARATUS

(75) Inventors: Hee-chul Han, Hwaseong-si (KR); Emi Arai, Suwon-si (KR); Yang-lim Choi, Seongnam-si (KR); Jin-gu Jeong, Ansan-si (KR); Sang-jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 13/112,364

(22) Filed: May 20, 2011

(65) Prior Publication Data

US 2012/0063697 A1 Mar. 15, 2012

(30) Foreign Application Priority Data

Sep. 13, 2010 (KR) .................... 10-2010-0089463

(51) Int. Cl.
*G06K 9/40* (2006.01)
*G06K 9/36* (2006.01)

(52) U.S. Cl.
USPC .......................... 382/255; 382/264; 382/284

(58) Field of Classification Search
USPC ......... 382/168, 219, 220, 255, 264, 284, 298, 382/300, 305, 312; 348/234, 235, 239, 348/240.99; 345/629; 358/1.2, 525, 528, 358/540
See application file for complete search history.

(56) References Cited

U.S. PATENT DOCUMENTS

| | | | | |
|---|---|---|---|---|
| 4,781,446 A | * | 11/1988 | Tanaka et al. | 359/680 |
| 4,937,609 A | * | 6/1990 | Wakabayashi et al. | 396/73 |
| 5,434,617 A | * | 7/1995 | Bianchi | 348/170 |
| 5,841,590 A | * | 11/1998 | Sato | 359/763 |
| 6,198,844 B1 | * | 3/2001 | Nomura | 382/168 |
| 6,373,592 B1 | * | 4/2002 | Ito | 358/1.2 |
| 6,697,082 B1 | * | 2/2004 | Takeuchi | 345/629 |
| 7,679,657 B2 | * | 3/2010 | Morita | 348/240.2 |
| 7,683,944 B2 | * | 3/2010 | Horita | 348/234 |

FOREIGN PATENT DOCUMENTS

KR 10-2007-0097638 A 10/2007

* cited by examiner

*Primary Examiner* — Kanjibhai Patel
(74) *Attorney, Agent, or Firm* — Sughrue Mion, PLLC

(57) ABSTRACT

An image processing method and an image processing apparatus, the method including: generating a blurry image by using a maximum telephoto image among N (where N is a natural number equal to or greater than 2) live view images; generating an alpha map by using two or more images of the N live view images; and generating a soft focus image by combining the maximum telephoto image and the blurry image by using the alpha map.

34 Claims, 5 Drawing Sheets

IMAGE PROCESSING METHOD AND IMAGE PROCESSING APPARATUS

CROSS-REFERENCE TO RELATED PATENT APPLICATION

This application claims the benefit of Korean Patent Application No. 10-2010-0089463, filed on Sep. 13, 2010 in the Korean Intellectual Property Office, the disclosure of which is incorporated herein in its entirety by reference.

BACKGROUND

1. Field

Methods and apparatuses consistent with exemplary embodiments relate to an image processing method and an image processing apparatus, and more particularly, to an image processing method and an image processing apparatus for easily obtaining a soft focus image by using a live view image having different viewing angles.

2. Description of the Related Art

Soft focus photographing is used to retain sharp edges of a subject such as a person by blurring a background of the subject. In general, a soft focus image is generated by producing a plurality of photos having different iris values and combining a soft image of a background captured by opening an iris to the maximum and an image of a subject captured by closing the iris to the maximum. However, in order to achieve soft focus photographing, a camera and a subject are not allowed to move until a plurality of photographs are produced. Furthermore, a camera having a high iris value, such as an automatic digital camera or a camera embedded in a mobile phone, cannot generate a soft focus image due to an indistinctive difference between an image obtained by opening an iris to the maximum and an image obtained by opening the iris to the minimum by closing the iris to the maximum.

SUMMARY

Aspects of exemplary embodiments provide an image processing method and an image processing apparatus for easily obtaining a soft focus image by using a live view image having different viewing angles.

According to an exemplary embodiment, there is provided an image processing method including: generating a blurry image by using a maximum telephoto image among N (where N is a natural number equal to or greater than 2) live view images; generating an alpha map by using two or more images of the N live view images; and generating a soft focus image by combining the maximum telephoto image and the blurry image by using the alpha map.

The image processing method may further include: receiving a soft focus image generation command; displaying the N live view images in accordance with the soft focus image generation command; and capturing the maximum telephoto image from among the displayed N live view images. The image processing method may further include displaying a maximum telephoto region on each of the N live view images.

The generating of the blurry image may include: generating multiple size images by using the maximum telephoto image; low pass filtering each of the multiple size images; interpolating each of the low pass filtered multiple size images; and generating the blurry image by summing the interpolated images.

The N live view images may have different viewing angles. The N live view images may have different iris values.

The generating of the alpha map may include: generating the alpha map by using the maximum telephoto image and a maximum wide angle image among the N live view images. The generating of the alpha map may include: generating a blurring map indicating a similarity between the maximum telephoto image and the maximum wide angle image as a blurring value.

The generating of the blurring map may include: generating an image of a first size by clipping the maximum wide angle image; resizing the maximum telephoto image to the first size; and obtaining a similarity between the clipped maximum wide angle image and the resized maximum telephoto image. The generating of the alpha map may include: generating a weight map by analyzing the maximum telephoto image; generating a weighted blurring map by applying the weight map to the blurring map; and generating the alpha map by separating a front view region and a rear view region from the weighted blurring map.

The weight map may include one or more of the face recognition map and the depth map with respect to the maximum telephoto image. The generating of the soft focus image may include generating the soft focus image by combining a front view of the maximum telephoto image and a rear view of the blurry image by using the alpha map.

The front view region and the rear view region of the alpha map may have a first value and a second value, respectively, the method further including: reducing or expanding the front view region of the alpha map at a predetermined ratio; and generating a blurred alpha map by gradating a value of the reduced or expanded front view region of the alpha map as a value between the first value and the second value, wherein the generating of the soft focus image includes: giving a weight $\alpha$ (where $\alpha$ is a rational number greater than or equal to 0 and smaller than or equal to 1) to pixels of the blurry image and a weight $1-\alpha$ to pixels of the maximum telephoto image according to a value of the blurred alpha map, and combining the pixels to which the weights are given.

The generating of the soft focus image may include: performing first signal processing on the blurry image; performing second signal processing on the maximum telephoto image; performing Gaussian blurring on the alpha map or the weighted blurring map; and generating the soft focus image by combining the first signal processed blurry image and the second signal processed maximum telephoto image by using the Gaussian blurred map.

The performing of the first signal processing may include converting one or more of brightness and chroma of the blurry image, and wherein the performing of the signal processing includes: converting one or more of an illumination tone, detail, and color of the maximum telephoto image.

The performing of the first signal processing may include adjusting a histogram of the blurry image to darken a brightness of the blurry image and lower a contrast thereof, and wherein the performing of the signal processing includes adjusting a histogram of the maximum telephoto image to increase a brightness of the maximum telephoto image and increase a contrast thereof.

According to another aspect of an exemplary embodiment, there is provided an image processing apparatus including: a blurry image generating unit for generating a blurry image by using a maximum telephoto image among N (where N is a natural number equal to or greater than 2) live view images; an alpha map generating unit for generating an alpha map by using two or more images of the N live view images; and a soft focus image generating unit for generating a soft focus image by combining the maximum telephoto image and the blurry image by using the alpha map.

According to another aspect of an exemplary embodiment, there is provided a computer readable recording medium having embodied thereon a computer program for executing an image processing method, the method including: generating a blurry image by using a maximum telephoto image among N (where N is a natural number equal to or greater than 2) live view images; generating an alpha map by using two or more images of the N live view images; and generating a soft focus image by combining the maximum telephoto image and the blurry image by using the alpha map.

BRIEF DESCRIPTION OF THE DRAWINGS

The above and/or other features and advantages of the exemplary embodiments will become more apparent by describing in detail the exemplary embodiments with reference to the attached drawings in which.

DETAILED DESCRIPTION OF EXEMPLARY EMBODIMENTS

Hereinafter, certain exemplary embodiments will be described more fully with reference to the accompanying drawings.

Figure 1:
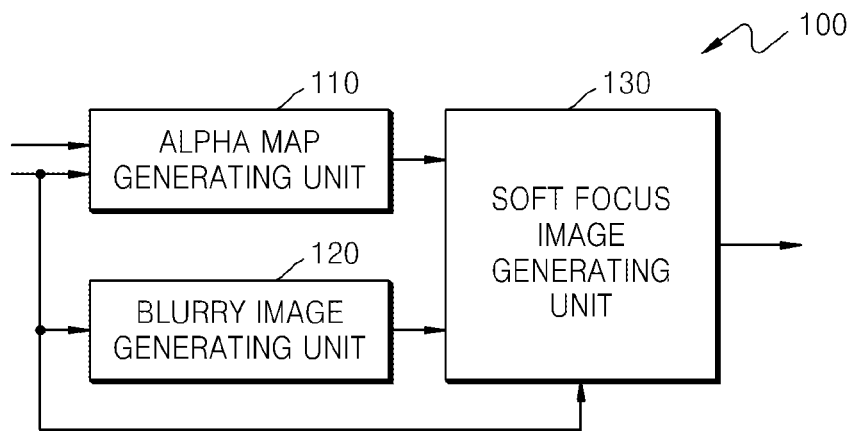
FIG. 1 is a block diagram of an image processing apparatus, according to an exemplary embodiment.

FIG. 1 is a block diagram of an image processing apparatus 100, according to an exemplary embodiment. Referring to FIG. 1, the image processing apparatus 100 used for capturing an image and generating an image file, may be a digital camera, a camcorder, a device with a camera module embedded therein, such as a personal digital assistant (PDA), a portable media player (PMP), a mobile phone, a smart phone, a navigation device, etc., or an ultra mobile PC (UMPC), and the like.

The image processing apparatus 100 includes an alpha map generating unit 110, a blurry image generating unit 120, and a soft focus image generating unit 130. Although not shown, the image processing apparatus 100 may further include a lens, an image sensor (CCD or CMOS), a display unit that displays a live view image, and a user interface that interfaces with a user.

If the user requests to generate a soft focus image through a user interface, the image processing apparatus 100 sequentially outputs N (where N is a natural number equal to or greater than 2) live view images in response to the user's request.

The image processing apparatus 100 transfers an image to the image sensor through the lens. Thereafter, the image is converted into an electrical signal. A live view image is an image displayed on a display unit, such as a liquid crystal display (LCD), by performing electronic processing on light captured by an image sensor.

The image processing apparatus 100 may allow the display unit to display a maximum telephoto region on the N live view images when the N live view images are displayed on the display unit. A virtual focus may allow the user to recognize the maximum telephoto region that is a maximum photographing region since the image processing apparatus 100 displays the maximum telephoto region on the N live view images.

The image processing apparatus 100 may sequentially output the N live view images having different viewing angles. A change in focal distance of a zoom lens results in a change in viewing angle of an image, and thus the image processing apparatus 100 may output the N live view images having different viewing angles by continuously changing the focal distance of the zoom lens.

Alternatively, the image processing apparatus 100 may output the N live view images having different values of an iris by adjusting an opening and closing level of the iris.

Alternatively, the image processing apparatus 100 may output the N live view images having different viewing angles and different values of the iris by changing the focal distance of the zoom lens and a value of the iris.

The image processing apparatus 100 captures one of the N live view images and generates an image file. The image processing apparatus 100 may generate an image file of a maximum telephoto image from among the N live view images.

The image processing apparatus 100 does not use a plurality of image files but uses the image file of the maximum telephoto image and the other live view image files to generate the soft focus image. The live view image has a low resolution and a very small capture time, and thus there is little delay in capturing the N live view images to generate the plurality of image files, which reduces a complexity of signal processing and makes signal processing faster. Furthermore, it is unnecessary to fix both a subject and a camera until a plurality of photographing operations are completely performed.

The maximum telephoto image frequently tends to shake due to the shaking of the camera held by a user. Thus, the image processing apparatus 100 may correct the maximum telephoto image as a maximum wide angle image when an image is blurred due to shaking of the camera.

The alpha map generating unit 110 generates an alpha map by using two or more images among the N live view images. The alpha map generating unit 110 compares two or more images among the N live view images, obtains similarities between the two or more images, and generates a blurring map that indicates the similarities between the two or more images as blurring values.

The alpha map generating unit 110 generates a weight map by analyzing the maximum telephoto image among the N live view images, sums the blurring map and the weight map, and generates a weighted blurring map. The alpha map generating unit 110 generates the alpha map that is bisected into a front view region and a rear view region by segmenting the weighted blurring map, and sends the alpha map to the soft focus image generating unit 130.

The blurry image generating unit 120 generates a blurry image by using one of the N live view images. Since a live view image having a maximum iris opening and a maximum telephoto viewing angle has the largest blurriness due to the shaking of the camera, the blurry image generating unit 120 may generate the blurry image by using one of the N live view images having the maximum iris opening and the maximum telephoto viewing angle.

The blurry image generating unit 120 generates multiple size images having different resolutions by using one of the N live view images. The blurry image generating unit 120 filters the multiple size images by using a low pass filter (LPF) and removes a high frequency component from each of the multiple size images. The blurry image generating unit 120 interpolates each of the filtered multiple size images, combines the interpolated images, and generates the blurry image. The blurry image generating unit 120 sends the blurry image to the soft focus image generating unit 130.

The soft focus image generating unit 130 generates the soft focus image having a clear front image and a blurry rear image by using the alpha map. The soft focus image generating unit 130 combines a rear view of the blurry image and a front view of a captured image by using the alpha map and generates the soft focus image.

In the present exemplary embodiment, the user can easily generate the soft focus image while viewing the N live view images.

Furthermore, the user can recognize the maximum telephoto region by displaying the maximum telephoto region on the N live view images.

Furthermore, the user can generate the soft focus image by using the N live view images having different viewing angles from the maximum wide angle image to the maximum telephoto image by adjusting the focal distance of the zoom lens.

Furthermore, since the soft focus image is generated by capturing an image only once, it is unnecessary to fix both a subject and a camera until a plurality of images are completely captured, thus increasing the signal processing speed.

Figure 2:
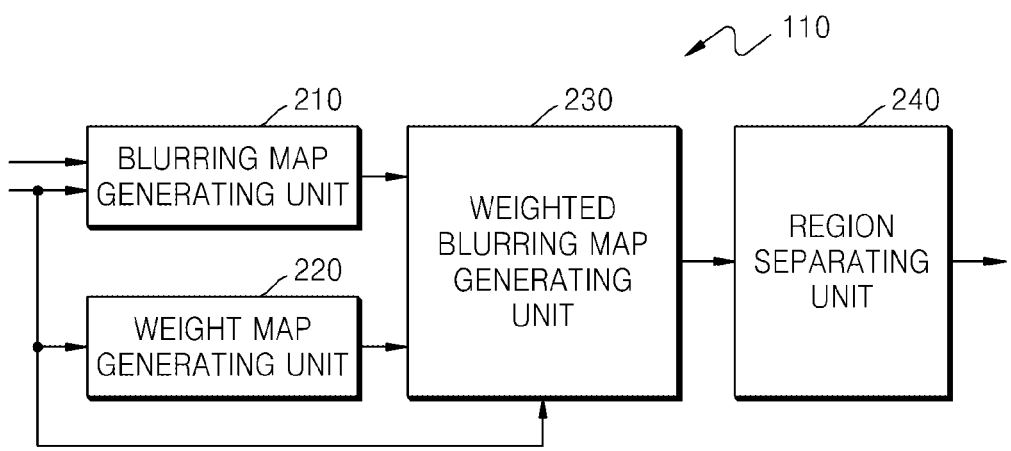
FIG. 2 is a block diagram of an alpha map generating unit of FIG. 1, according to an exemplary embodiment.

FIG. 2 is a block diagram of the alpha map generating unit 110, according to an exemplary embodiment. Referring to FIG. 2, the alpha map generating unit 110 includes a blurring map generating unit 210, a weight map generating unit 220, a weighted blurring map generating unit 230, and a region separating unit 240.

The blurring map generating unit 210 generates a blurring map by comparing two or more live view images among the N live view images and allocating different blurring values according to similarities between the two or more live view images.

The blurring map is a map indicating a clearness difference between a blurry image and a clear image. The blurring map generating unit 210 may generate the blurring map by comparing the clearest image and the blurriest image among the N live view images.

An image becomes blurry from a wide angle to a telephoto, and from a minimum iris opening to a maximum iris opening. Thus, the blurring map generating unit 210 may generate the blurring map by comparing a maximum telephoto image and a maximum wide angle image among the N live view images, by comparing an image having a smallest iris value and an image having a greatest iris value, or by comparing an image having a minimum iris opening and a maximum wide angle and an image having a maximum iris opening and a maximum telephoto.

When similarities between images having different sizes are compared, the blurring map generating unit 210 may adjust sizes of the images. More specifically, the blurring map generating unit 210 may adjust the sizes of the images in such a way that subjects included in the images can have the same sizes. The blurring map generating unit 210 may generate an image of a first size by clipping the maximum wide angle image, resize the maximum telephoto image to the first size, adjust subjects included in the clipped maximum wide angle image and the resized maximum telephoto image to have the same size, and compare similarities between the clipped maximum wide angle image and the resized maximum telephoto image.

The blurring map generating unit 210 allocates different blurring values to pixels according to similarities between images by using a filter such as a Gaussian blurring filter, and represents the allocated blurring values as an achromatic mask.

If a range of the blurring values is greater than or equal to 1 and smaller than or equal to 2, since the resized maximum wide angle image has a clear subject and background, and the maximum telephoto image has a clear subject and a blurry rear view, the blurring map generating unit 210 may allocate a first blurring value to pixels of a subject region having no difference in terms of clearness and allocate a second blurring value to pixels of a background region having a greatest difference in terms of clearness by comparing the resized maximum wide angle image and the maximum telephoto image. The blurring map generating unit 210 may also allocate blurring values between the first blurring value and the second blurring value to pixels according to differences in terms of clearness between images.

The blurring map generating unit 210 generates the blurring map that is the achromatic mask by using the blurring values allocated to the pixels. The blurring map generating unit 210 generates the blurring map that represents pixels having the first blurring value as a white color, pixels having the second blurring value as a black color, and pixels having the blurring values between the first blurring value and the second blurring value as a gray color having various brightness.

The blurring map generating unit 210 sends the blurring map to the weighted blurring map generating unit 230.

If the maximum telephoto image is a captured image having no detail background around a subject, for example, if a background is a wall having no pattern and is all the same color, the blurring map generating unit 210 may fail to determine whether the maximum telephoto image has a clear rear view or a blurry rear view, may fail to determine that the maximum telephoto image and the maximum wide angle image have a clear background, and may fail to allocate the first blurring value to pixels of a background region.

To prevent such an error, the weight map generating unit 220 may generate a weight map by analyzing the captured image, i.e., the maximum telephoto image.

The weight map generating unit 220 may generate a face recognition map that differentiates shapes of a human face and a human body from the other shapes by analyzing the maximum telephoto image, if the maximum telephoto image includes the human face or the human body, recognizing the human face, and predicting a human face contour and a human body size according to the human face.

Alternatively, the weight map generating unit 220 may generate a depth map with respect to the maximum telephoto image by performing an infrared auto focus (AF) function and obtaining a distance value from a subject to an AF point. The AF function is for automatically focusing on the subject. The infrared AF function may obtain a distance from a focused subject to the AF point by emitting an infrared ray and using the infrared ray reflected from the focused subject.

The weight map generating unit 220 allocates weight values to the face recognition map and the depth map, sums the face recognition map and the depth map, generates the weight map, and sends the weight map to the weighted blurring map generating unit 230.

The weighted blurring map generating unit 230 combines the weight map and the blurring map and generates a weighted blurring map. The weighted blurring map generating unit 230 sends the weighted blurring map to the region separating unit 240.

The region separating unit 240 generates an alpha map by segmenting the weighted blurring map into a front view and a rear view. The alpha map is a mask used to separate regions and may be represented as a white color and a black color. The region separating unit 240 may generate the alpha map having a white front view and a black rear view.

In an exemplary embodiment, the blurring map may be generated by comparing images having different viewing angles.

Furthermore, the alpha map may be finally generated by analyzing the maximum telephoto image, generating the weight map, and combining the blurring map and the weight map.

Figure 3:
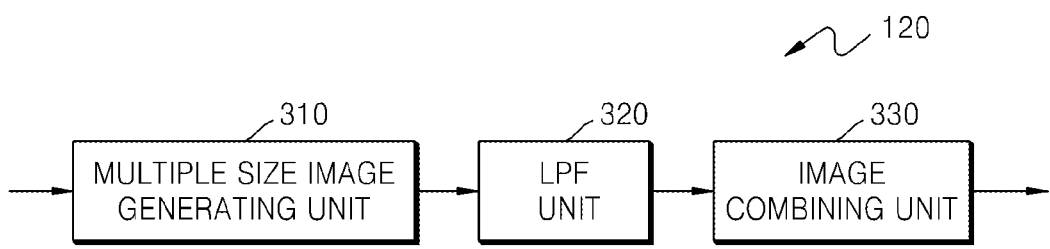
FIG. 3 is a block diagram of a blurry image generating unit of FIG. 1, according to an exemplary embodiment.

FIG. 3 is a block diagram of the blurry image generating unit 120 of FIG. 1, according to an exemplary embodiment. Referring to FIG. 3, the blurry image generating unit 120 includes a multiple size image generating unit 310, an LPF unit 320, and an image combining unit 330.

The multiple size image generation unit 310 generates multiple size images by using a captured image. The multiple size image generation unit 310 generates images having reduced sizes and resolutions in a pyramid shape by resizing an original image. For example, if the size of the captured image is 640*480 pixels, the multiple size image generation unit 310 generates images of sizes of 320*240 pixels, 160*120 pixels, etc. by using the captured image. The multiple size image generation unit 310 sends a maximum telephoto image and the multiple size images to the low pass filter (LPF) unit 320.

The LPF unit 320 filters the multiple size images by using a LPF. A low frequency component of an image has a small color difference with a peripheral region, and a high frequency component of the image has a large color difference with the peripheral region. Thus, the multiple size images that pass through the LPF unit 320 are more soft and blurry after the high frequency component, such as a detailed part, i.e. a boundary surface of a subject, corners, an outline part, etc., is removed from the multiple size images.

The LPF unit 320 low-pass-filters the multiple size images.

The image combining unit 330 interpolates the low-pass-filtered multiple size images and restores the interpolated images to the original size images. In this case, the smaller the images, the blurrier the details of the images. The image combining unit 330 sums the restored images and generates a blurry image. In this case, the images having various details are combined to generate natural and blurry images.

In the exemplary embodiment, the multiple size images may be generated by using the maximum telephoto image, and the blurry image may be generated by using the multiple size images.

Figure 4:
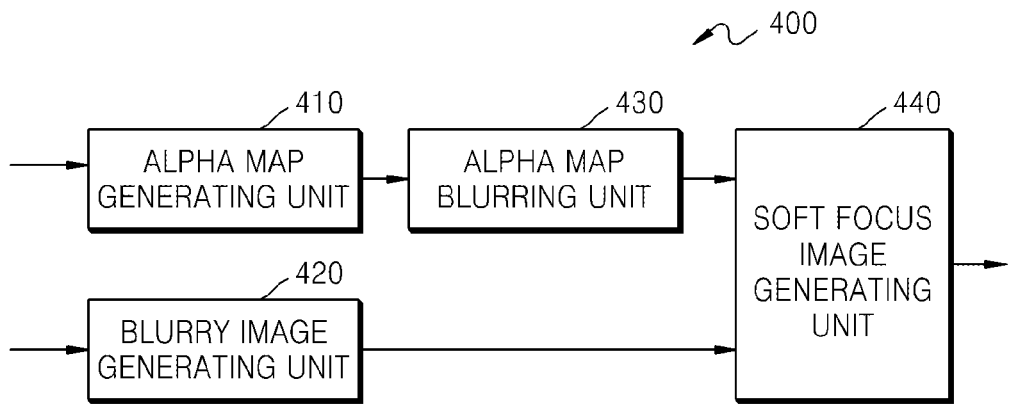
FIG. 4 is a block diagram of an image processing apparatus, according to an exemplary embodiment.

FIG. 4 is a block diagram of an image processing apparatus 400, according to another exemplary embodiment. Referring to FIG. 4, the image processing apparatus 400 includes an alpha map generating unit 410, a blurry image generating unit 420, an alpha map blurring unit 430, and a soft focus image generating unit 440. The image processing apparatus 400 further includes the alpha map blurring unit 430 which is different from the image processing apparatus 100 of FIG. 100.

The alpha map generating unit 410, the blurry image generating unit 420, and the soft focus image generating unit 440 have the same functions as the alpha map generating unit 110, the blurry image generating unit 120, and the soft focus image generating unit 130 of FIG. 1 and thus detailed descriptions thereof will not be repeated here.

The alpha map generating unit 410 generates a blurring map, applies a weight map to the blurring map, separates a front view and a rear view, and generates an alpha map.

The blurry image generating unit 420 generates a blurry image by using a captured image, i.e. a maximum telephoto image.

The soft focus image generating unit 440 generates a soft focus image by combining a rear view of the blurry image and a front view of the captured image by using the alpha map. A boundary of a subject appears gradated. However, since the alpha map is bisected into the front view and the rear view, a boundary part between the front view and the rear view of the soft focus image may look too clear to be natural.

To prevent this, in the exemplary embodiment, the alpha map blurring unit 430 blurs a boundary region between the front view and the rear view of the alpha map to make a boundary between the front view and the rear view appear more natural.

The alpha map blurring unit 430 generates an alpha map having a front view region reduced or expanded in a predetermined ratio by reducing a front view region of the alpha map in a predetermined distance or expanding the front view region to a rear view region in a predetermined distance.

The alpha map blurring unit 430 blurs the reduced or expanded front view region. More specifically, the alpha map blurring unit 430 gradates the reduced or expanded front view region as a value between the front view region and the rear view region. If the front view and the rear view of the alpha map have a first value and a second value, respectively, the alpha map blurring unit 430 gradates the reduced or expanded front view region from the front view region to the rear region as a value between the first value and the second value. More specifically, if the front view region of the alpha map is white, and the rear view thereof is black, the alpha map blurring unit 430 gradates the reduced or expanded front view region from the front view region to the rear region as a gray color from high brightness to low brightness.

The soft focus image generating unit 440 generates a soft focus image by using the blurred alpha map. The soft focus image generating unit 440 uses the captured image, i.e. the maximum telephoto image of a white region of the alpha map and the blurry image of a black region of the alpha map. The soft focus image generating unit 440 gives a weight to a gray region of the alpha map, i.e., the boundary region between the front view and the rear view, at different ratios according to brightness and combines the maximum telephoto image and the blurry image. More specifically, the soft focus image generating unit 440 gives a weight $\alpha$ to pixels of the blurry image, a weight $1-\alpha$ to pixels of the maximum telephoto image according to a value of the blurred alpha map, and combines the pixels to which the weights are given. In this regard, a may be a rational number greater than or equal to 0 and smaller than or equal to 1.

In the exemplary embodiment, the boundary region between the front view and the rear view may look natural by blurring the front view region and the rear view region of the alpha map, and combining the blurry image and the captured image by using the blurred alpha map.

Figure 5:
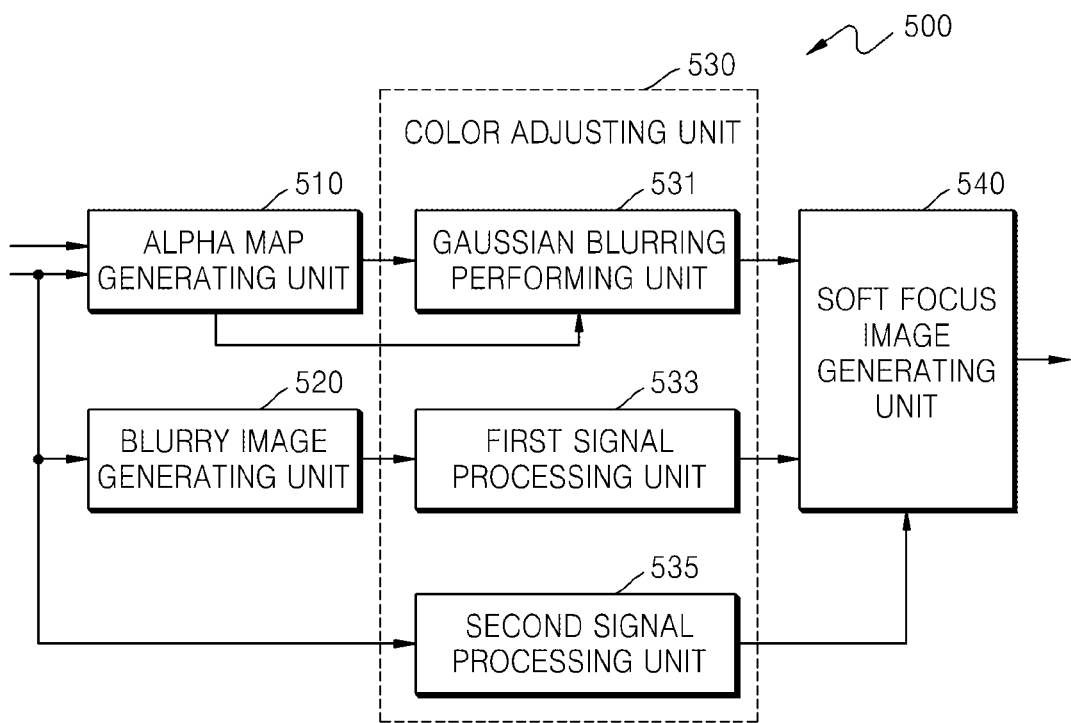
FIG. 5 is a block diagram of an image processing apparatus, according to an exemplary embodiment.

FIG. 5 is a block diagram of an image processing apparatus 500, according to another exemplary embodiment. Referring to FIG. 5, the image processing apparatus 500 includes an alpha map generating unit 510, a blurry image generating unit 520, a color adjusting unit 530, and a soft focus image generating unit 540. The image processing apparatus 500 is different from the image processing apparatus 100 of FIG. 100 in that the image processing apparatus 500 further includes the color adjusting unit 530.

The alpha map generating unit 510, the blurry image generating unit 520, and the soft focus image generating unit 540 have the same functions as the alpha map generating unit 110, the blurry image generating unit 120, and the soft focus image generating unit 130 of FIG. 1 and thus detailed descriptions thereof will not be repeated here.

The image processing apparatus 500 may further include a display unit (not shown) that displays a live view image and a user interface (not shown) that interfaces with a user. The user may select a color adjustment function by using the user interface. If the user selects the color adjustment function, the image processing apparatus 500 may adjust a color of an image by activating the color adjustment unit 530.

The farther the distance between a light source and an object, the less the brightness of the object in inverse proportion to a square of the distance (inverse-square law). The farther the distance, the lower the contrast of the object according to particles in the air (aerial distance). The color adjusting unit 530 adjusts a color of a maximum telephoto image that is to be used as a front view and a color of a blurry image that is to be used as a rear view in order to reflect a change in colors of the front view and the rear view according to a physical distance to the image.

The color adjusting unit 530 includes a Gaussian blurring performing unit 531, a first signal processing unit 533, and a second signal processing unit 535.

The Gaussian blurring performing unit 531 filters the alpha map generated by the alpha map generating unit 510 or the weighted blurring map generated before generating the alpha map by using a Gaussian blur. Such a filtering by using the Gaussian blur makes pixels blurry by a designated range so that the image looks soft. The Gaussian blur may be determined as a value between 0~255. The greater the value of the Gaussian blur value, the wider the diameter thereof. The Gaussian blurring performing unit 531 sends the Gaussian blurred alpha map or the Gaussian blurred weighted blurring map to the soft focus image generating unit 540. If a soft focus image is generated by using the Gaussian blurred alpha map or the Gaussian blurred weighted blurring map, the image looks softer.

The first signal processing unit 533 performs signal processing on the blurry image generated by the blurry image generating unit 520. Since the blurry image is used as a rear view of the soft focus image, the first signal processing unit 533 performs signal processing on the blurry image to change one or more of a chroma, brightness, and contrast of the blurry image so that the blurry image is darker and blurrier than the original image. The first signal processing unit 533 sends the blurry image on which the signal processing is performed to the soft focus image generating unit 540.

The second signal processing unit 535 performs signal processing on a captured image, i.e., the maximum telephoto image. Since the maximum telephoto image is used as a front view of the soft focus image, the second signal processing unit 535 removes a distortion or noise from an image by processing one or more of an illumination tone, detail, color, etc. of the maximum telephoto image. More specifically, the second signal processing unit 535 separates the captured image including red (R), green (G), and black (B) components into a color layer including a color component, a base layer including an illumination component, and a detail layer including a reflection component, and removes an image distortion component of each of the color layer, the base layer, and the detail layer.

The second signal processing unit 535 performs signal processing on the base layer so that a variation of a luminance dynamical range of a dark region is greater than that of a luminance dynamic range of a bright region, performs signal processing on the detail layer so that noise of the dark region is removed while detail of the bright region maintains clear, and obtains a luminance component of the restored image by using the base layer and the detail layer on which signal processing is performed. The second signal processing unit 535 corrects the color layer based on a rate of a luminance component of the maximum telephoto image and the luminance component of the restored image, and adjusts a chroma based on a variation of the luminance component, thereby representing a natural color.

The second signal processing unit 535 combines the luminance component and the color component from which the distortion component is removed, converts the combined component into an RGB component, restores the maximum telephoto image, and sends the maximum telephoto image to the soft focus image generating unit 540.

The soft focus image generating unit 540 combines the blurry image on which signal processing is performed and which is received from the first signal processing unit 533 and the maximum telephoto image on which signal processing is performed and which is received from the second signal processing unit 535, by using the Gaussian blurred alpha map or the Gaussian blurred weighted blurring map received from the Gaussian blurring performing unit 531. The soft focus image generating unit 540 gives weights to pixels of a first signal processed blurry image and a second signal processed maximum telephoto image according to a value of the Gaussian blurred alpha map or the Gaussian blurred weighted blurring map, and combines the first signal processed blurry image and the second signal processed maximum telephoto image.

Alternatively, the first signal processing unit 533 and the second signal processing unit 535 obtain a histogram of the blurry image and a histogram of the maximum telephoto image and adjust the histograms, thereby more easily adjusting colors of the blurry image and the maximum telephoto image. More specifically, the first signal processing unit 533 and the second signal processing unit 535 adjust a frequency distribution of a frequency distribution table with respect to the distribution characteristics of the luminance component, thereby adjusting brightness or contrast of an image.

In a low contrast situation or excessive or not enough exposure, frequencies of a histogram of an image do not spread in all gray scales but are concentrated in one gray scale. Therefore, the second signal processing unit 535 may adjust a color of the maximum telephoto image by stretching or equalizing the histogram so that frequencies of the histogram of the maximum telephoto image are equally distributed over all gray scales. To the contrary, the first signal processing unit 533 lowers a contrast and reduces brightness by adjusting the histogram so that frequencies of the histogram of the blurry image are concentrated on one gray scale.

In the exemplary embodiment, the first signal processing unit 533 and the second signal processing unit 535 perform signal processing on the blurry image and the magnetic telephoto image, respectively, and combine the blurry image and the magnetic telephoto image, thereby generating the soft focus image reflecting a change in colors of the front view and the rear view according to a distance.

Figure 6A:
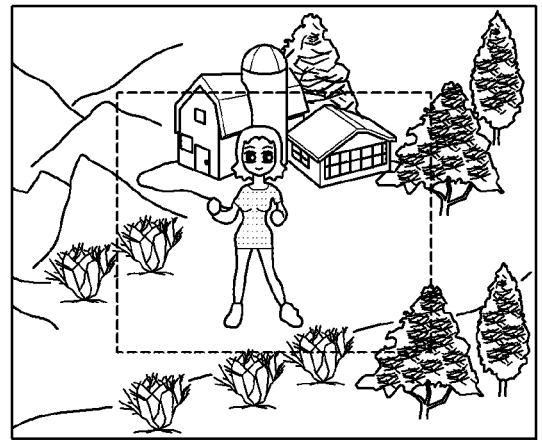
FIGS. 6A, 6B, and 6C illustrate live view images output to a display unit of the image processing apparatus of FIG. 1, according to an exemplary embodiment.
Figure 6B:
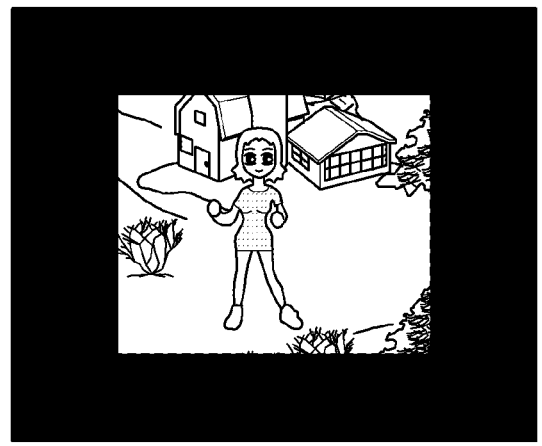
Figure 6C:
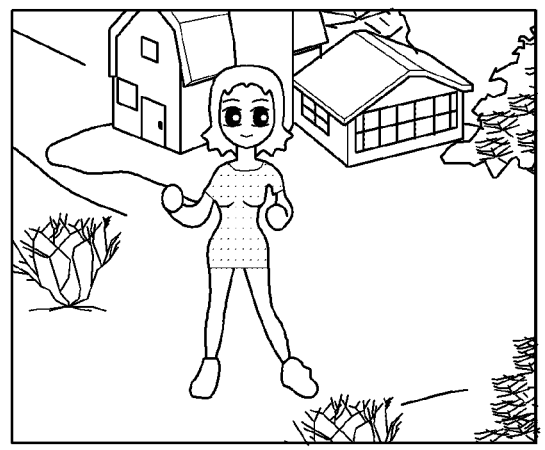

FIGS. 6A, 6B, and 6C illustrate live view images output to a display unit of the image processing apparatus 100, according to an exemplary embodiment.

If a user requests to generate a soft focus image through a user interface, the image processing apparatus 100 sequentially outputs N (where N is a natural number equal to or greater than 2) live view images to the display unit in response to the user's request.

As described above, the most effective soft focus image can be obtained when an iris is opened to the maximum and a viewing angle is at the maximum telephoto. Thus, in an exemplary embodiment, the image processing apparatus 100 captures a live view image when the live view image is the maximum telephoto image and generates a soft focus image. The image processing apparatus 100 displays a maximum telephoto region on the live view image, so that the user can recognize an image that is to be obtained as the soft focus image.

In FIGS. 6A, 6B, and 6C, the maximum telephoto region is indicated on the live view image in various ways. Referring to FIG. 6A, the maximum telephoto region is indicated with a dotted line on the live view image. Referring to FIG. 6B, the live view image is black except for the maximum telephoto region so that the maximum telephoto region is seen from the live view image. Referring to FIG. 6C, the maximum telephoto region is magnified by zooming in on the live view image.

The user can recognize a region of a captured live view image and a soft focus image that is to be generated from a maximum telephoto region indicated on the live view image. Thus, the soft focus image desired by the user can be captured by adjusting a distance between the image processing apparatus 100 and a subject or adjusting a distance between the subject and a background.

Figure 7:
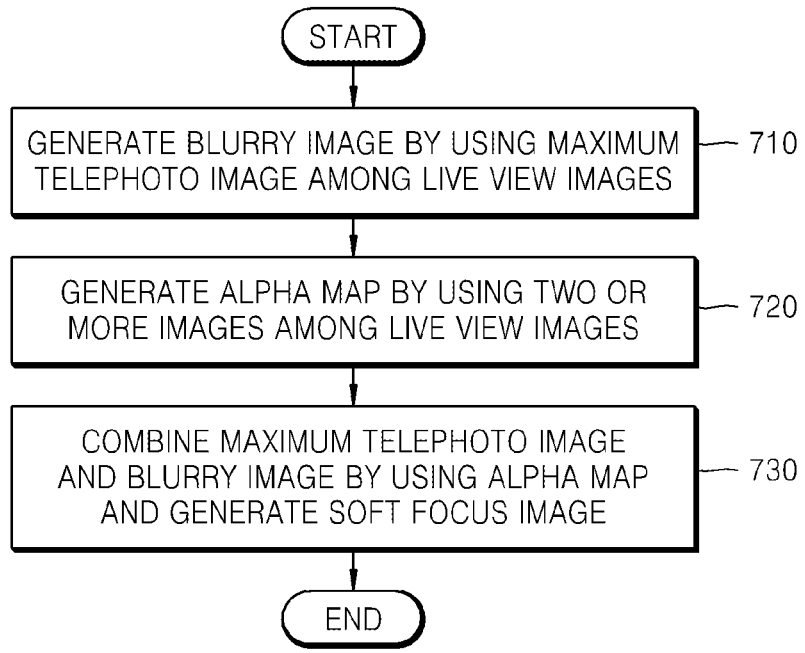
FIG. 7 is a flowchart illustrating an image processing method, according to an exemplary embodiment.

FIG. 7 is a flowchart illustrating an image processing method, according to an exemplary embodiment. Referring to FIG. 7, the image processing apparatus 100 outputs a plurality of live view images if a user requests to generate a soft focus image. The image processing apparatus 100 may display a maximum telephoto region on each of the displayed live view images. The image processing apparatus 100 captures a maximum telephoto region among the displayed live view images, and generates an image file.

The image processing apparatus 100 generates a blurry image by using the maximum telephoto image (operation 710). The image processing apparatus 100 generates an alpha map by using two or more of the displayed live view images (operation 720).

The image processing apparatus 100 combines a front view of the maximum telephoto image and a rear view of the blurry image by using the alpha map and generates the soft focus image (operation 730).

Figure 8:
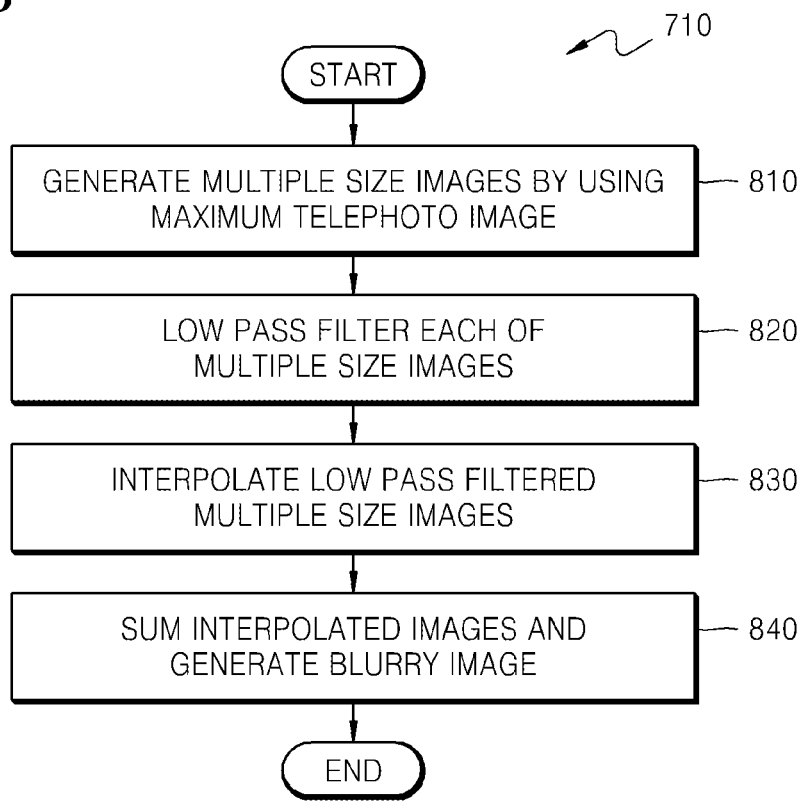
FIG. 8 is a flowchart illustrating an operation of generating a blurry image of FIG. 7, according to an exemplary embodiment.

FIG. 8 is a flowchart illustrating operation 710 of FIG. 7, according to an exemplary embodiment. Referring to FIG. 8, the image processing apparatus 100 generates a blurry image by using a maximum telephoto image among a plurality of live view images. To this end, the image processing apparatus 100 generates multiple size images by using the maximum telephoto image (operation 810). The image processing apparatus 100 low pass filters each of the multiple size images and removes high frequency components from the low pass filtered multiple size images (operation 820).

The image processing apparatus 100 interpolates the low pass filtered multiple size images and restores the original images (operation 830), sums the interpolated images and generates the blurry image (operation 840).

Figure 9:
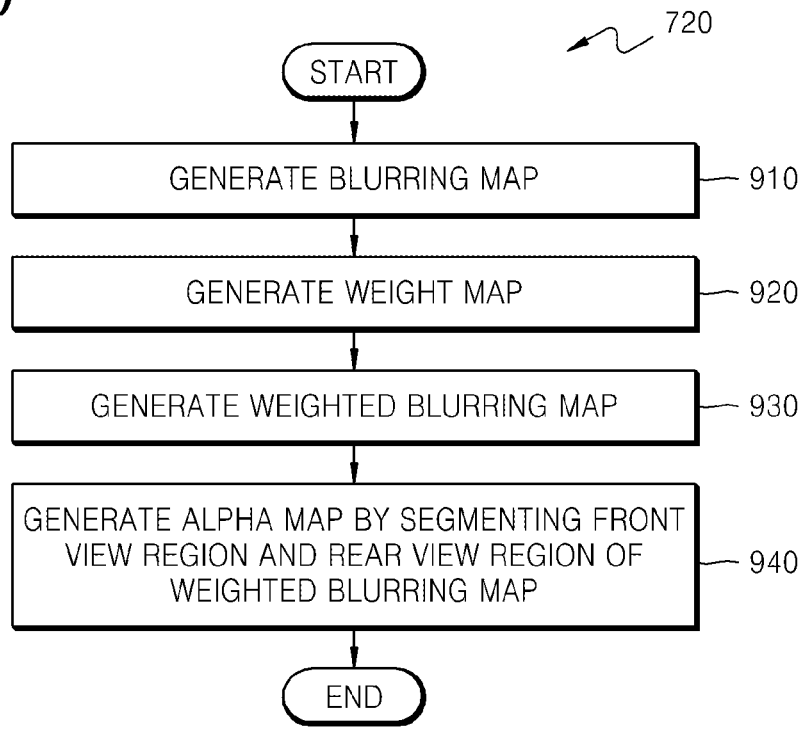
FIG. 9 is a flowchart illustrating an operation of generating an alpha map of FIG. 7, according to an exemplary embodiment.

FIG. 9 is a flowchart illustrating an operation of generating an alpha map of FIG. 7, according to an exemplary embodiment. Referring to FIG. 9, the image processing apparatus 100 generates a blurring map by using two or more of a plurality of live view images (operation 910). The image processing apparatus 100 may generate a blurring map indicating a difference between a maximum telephoto image and a maximum wide angle image from among the live view images as a blurring value.

The image processing apparatus 100 generates a weight map by analyzing a captured image, i.e., the maximum telephoto image (operation 920). The image processing apparatus 100 may generate a face recognition map by performing face recognition on the maximum telephoto image or generate a depth map regarding the maximum telephoto image by using a distance between the image processing apparatus 100 and a subject by using an AF function. The image processing apparatus 100 may generate the weight map by using one or more of the face recognition map and the depth map.

The image processing apparatus 100 generates a weighted blurring map by combining the weight map with the blurring map (operation 930).

The image processing apparatus 100 generates an alpha map that is a black mask by segmenting a front view region and a rear view region of the weighted blurring map (operation 940).

Figure 10:
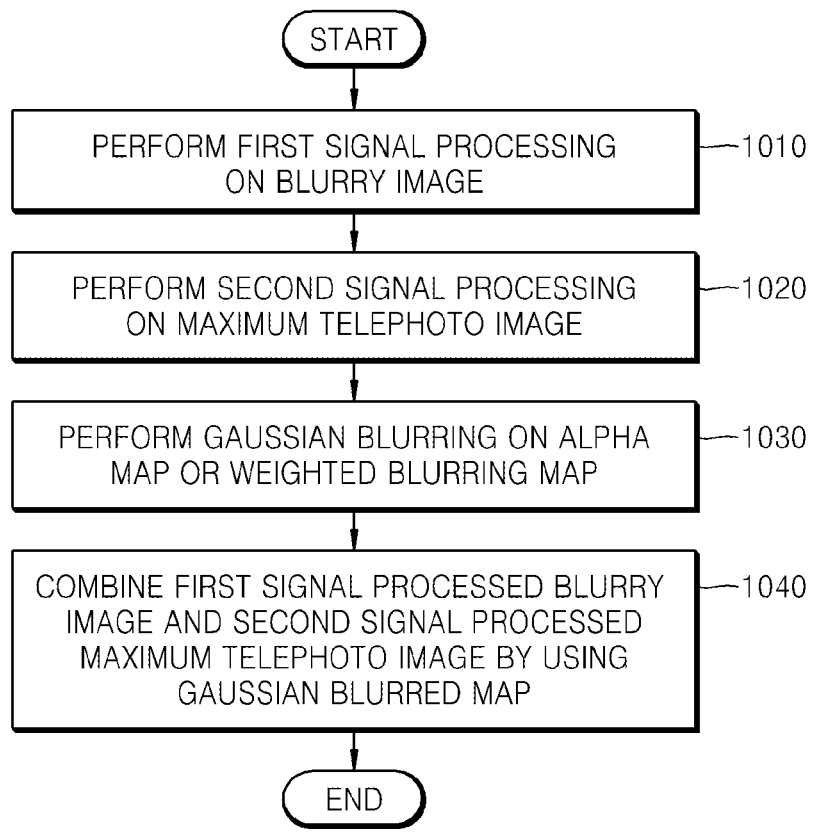
FIG. 10 is a flowchart illustrating a color adjusting operation performed by the image processing apparatus of FIG. 5, according to an exemplary embodiment.

FIG. 10 is a flowchart illustrating a color adjusting operation performed by the image processing apparatus 500 of FIG. 5, according to an exemplary embodiment. Referring to FIG. 10, the image processing apparatus 500 performs first signal processing on a blurry image (operation 1010). The image processing apparatus 500 may convert one or more of brightness, contrast, and chroma of the blurry image.

The image processing apparatus 500 performs second signal processing on a maximum telephoto image (operation 1020). The image processing apparatus 500 may convert one or more of an illumination tone, detail, and a color of the maximum telephoto image.

The image processing apparatus 500 may perform the first signal processing to darken a brightness of the blurry image and lower a contrast thereof by using a histogram of the blurry image, and perform the second signal processing to increase a brightness of the maximum telephoto image and increase a contrast thereof by using a histogram of the maximum telephoto image.

The image processing apparatus 500 performs Gaussian blurring on the alpha map or the weighted blurring map (operation 1030).

The image processing apparatus 500 generates a soft focus image having adjusted colors of a front view and a rear view from pixels of the first signal processed blurry image and the second signal processed maximum telephoto image by using the Gaussian blurred map (operation 1040).

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An image processing method comprising:
generating, by a processor, a blurry image by using a maximum telephoto image among N (where N is a natural number equal to or greater than 2) live view images;

generating, by the processor, an alpha map by using two or more images of the N live view images; and generating, by the processor, a soft focus image by combining the maximum telephoto image and the blurry image by using the alpha map.

2. The image processing method of claim 1, further comprising:

receiving a soft focus image generation command;

displaying the N live view images in accordance with the soft focus image generation command; and capturing the maximum telephoto image from among the displayed N live view images.

3. The image processing method of claim 2, further comprising:

displaying a maximum telephoto region on each of the N live view images.

4. The image processing method of claim 1, wherein the generating of the blurry image comprises:

generating multiple size images by using the maximum telephoto image;

low pass filtering each of the multiple size images;

interpolating each of the low pass filtered multiple size images; and generating the blurry image by summing the interpolated images.

5. The image processing method of claim 1, wherein the N live view images have different viewing angles.

6. The image processing method of claim 1, wherein the N live view images have different iris values.

7. The image processing method of claim 5, wherein the generating of the alpha map comprises: generating the alpha map by using the maximum telephoto image and a maximum wide angle image among the N live view images.

8. The image processing method of claim 7, wherein the generating of the alpha map comprises: generating a blurring map indicating a similarity between the maximum telephoto image and the maximum wide angle image as a blurring value.

9. The image processing method of claim 8, wherein the generating of the blurring map comprises:

generating an image of a first size by clipping the maximum wide angle image;

resizing the maximum telephoto image to the first size; and obtaining a similarity between the clipped maximum wide angle image and the resized maximum telephoto image.

10. The image processing method of claim 8, wherein the generating of the alpha map comprises:

generating a weight map by analyzing the maximum telephoto image;

generating a weighted blurring map by applying the weight map to the blurring map; and generating the alpha map by separating a front view region and a rear view region from the weighted blurring map.

11. The image processing method of claim 10, wherein the weight map comprises one or more of a face recognition map and a depth map with respect to the maximum telephoto image.

12. The image processing method of claim 10, wherein the generating of the soft focus image comprises: generating the soft focus image by combining a front view of the maximum telephoto image and a rear view of the blurry image by using the alpha map.

13. The image processing method of claim 10, wherein a front view region and a rear view region of the alpha map have a first value and a second value, respectively, the method further comprising:

reducing or expanding the front view region of the alpha map at a predetermined ratio; and generating a blurred alpha map by gradating a value of the reduced or expanded front view region of the alpha map as a value between the first value and the second value, wherein the generating of the soft focus image comprises: giving a weight $\alpha$ (where $\alpha$ is a rational number greater than or equal to 0 and smaller than or equal to 1) to pixels of the blurry image and a weight $1-\alpha$ to pixels of the maximum telephoto image according to a value of the blurred alpha map, and combining the pixels to which the weights are given.

14. The image processing method of claim 10, wherein the generating of the soft focus image comprises:

performing first signal processing on the blurry image;

performing second signal processing on the maximum telephoto image;

performing Gaussian blurring on the alpha map or the weighted blurring map; and generating the soft focus image by combining the first signal processed blurry image and the second signal processed maximum telephoto image by using the Gaussian blurred map.

15. The image processing method of claim 14, wherein the performing of the first signal processing comprises converting one or more of brightness and chroma of the blurry image, and wherein the performing of the second signal processing comprises: converting one or more of an illumination tone, detail, and color of the maximum telephoto image.

16. The image processing method of claim 14, wherein the performing of the first signal processing comprises adjusting a histogram of the blurry image to darken a brightness of the blurry image and lower a contrast thereof, and wherein the performing of the second signal processing comprises adjusting a histogram of the maximum telephoto image to increase a brightness of the maximum telephoto image and increase a contrast thereof.

17. An image processing apparatus comprising:

a blurry image generating unit which generates a blurry image by using a maximum telephoto image among N (where N is a natural number equal to or greater than 2) live view images;

an alpha map generating unit which generates an alpha map by using two or more images of the N live view images; and a soft focus image generating unit which generates a soft focus image by combining the maximum telephoto image and the blurry image by using the alpha map.

18. The image processing apparatus of claim 17, further comprising:

a user interface which receives an image capturing command;

a display unit which displays the N live view images in accordance with the image capturing command; and an image capturing unit which captures the maximum telephoto image among the displayed N live view images.

19. The image processing apparatus of claim 18, wherein the display unit displays a maximum telephoto region on each of the N live view images.

20. The image processing apparatus of claim 17, wherein the blurring image generating unit comprises:

a multiple size image generating unit which generates multiple size images by using the maximum telephoto image;

a low pass filtering unit which low pass filters each of the multiple size images; and an image combining unit which interpolates each of the low pass filtered multiple size images, sums the interpolated images, and generates the blurry image.

21. The image processing apparatus of claim 17, wherein the N live view images have different viewing angles.

22. The image processing apparatus of claim 21, wherein the N live view images have different iris values.

23. The image processing apparatus of claim 21, wherein the alpha map generating unit generates the alpha map by using the maximum telephoto image and a maximum wide angle image from among the N live view images.

24. The image processing apparatus of claim 23, wherein the alpha map generating unit comprises: a blurring map generating unit which generates a blurring map indicating a similarity between the maximum telephoto image and the maximum wide angle image as a blurring value.

25. The image processing apparatus of claim 24, wherein the blurring map generating unit generates an image of a first size by clipping the maximum wide angle image, resizes the maximum telephoto image to the first size, and obtains a similarity between the clipped maximum wide angle image and the resized maximum telephoto image.

26. The image processing apparatus of claim 24, wherein the alpha map generating unit comprises:
a weight map generating unit which generates a weight map by analyzing the maximum telephoto image;
a weighted blurring map generating unit which applies the weight map to the blurring map for generating a weighted blurring map; and
a region separating unit which generates the alpha map by separating a front view region and a rear view region from the weighted blurring map.

27. The image processing apparatus of claim 26, wherein the weight map comprises one or more of a face recognition map and a depth map with respect to the maximum telephoto image.

28. The image processing apparatus of claim 26, wherein the soft focus image generating unit generates the soft focus image by combining a front view of the maximum telephoto image and a rear view of the blurry image by using the alpha map.

29. The image processing apparatus of claim 26, wherein a front view region and a rear view region of the alpha map have a first value and a second value, respectively,
the apparatus further comprising: an alpha map blurring unit which reduces or expands the front view region of the alpha map at a predetermined ratio, grades a value of the reduced or expanded front view region of the alpha map as a value between the first value and the second value, and generates a blurred alpha map,
wherein the soft focus image generating unit gives a weight $\alpha$ ($\alpha$ is a rational number greater than or equal to 0 and smaller than or equal to 1) to pixels of the blurry image and a weight $1-\alpha$ to pixels of the maximum telephoto image according to a value of the blurred alpha map, and combines the pixels to which the weights are given.

30. The image processing apparatus of claim 26, wherein the soft focus image generating unit comprises:
a first signal processing unit which performs first signal processing on the blurry image;
a second signal processing unit which performs second signal processing on the maximum telephoto image;
a Gaussian blurring performing unit which performs Gaussian blurring on the alpha map or the weighted blurring map; and
an image combining unit which generates the soft focus image by combining the first signal processed blurry image and the second signal processed maximum telephoto image by using the Gaussian blurred alpha map.

31. The image processing apparatus of claim 30, wherein the first signal processing unit converts one or more of brightness and chroma of the blurry image, and
wherein the second signal processing unit converts one or more of an illumination tone, detail, and color of the maximum telephoto image.

32. The image processing apparatus of claim 30, wherein the first signal processing unit adjusts a histogram of the blurry image to darken a brightness of the blurry image and lower a contrast thereof, and
wherein the second signal processing unit adjusts a histogram of the maximum telephoto image to increase a brightness of the maximum telephoto image and increase a contrast thereof.

33. A non-transitory computer readable recording medium having embodied thereon a computer program for executing an image processing method, the method comprising:
generating a blurry image by using a maximum telephoto image among N (where N is a natural number equal to or greater than 2) live view images;
generating an alpha map by using two or more images of the N live view images; and
generating a soft focus image by combining the maximum telephoto image and the blurry image by using the alpha map.

34. The image processing apparatus of claim 28, wherein the alpha map is a mask used to separate regions and is represented as a white color and a black color.

* * * * *